Feb. 9, 1926.

W. H. HERMANN 1,572,011

TIRE BUILDING MACHINE

Filed Sept. 22, 1923  2 Sheets-Sheet 1

Inventor
Walter H. Hermann,

By

Attorneys

Inventor
Walter H. Hermann,
By
Attorneys

Patented Feb. 9, 1926.

1,572,011

UNITED STATES PATENT OFFICE.

WALTER H. HERMANN, OF LANCASTER, OHIO, ASSIGNOR TO HERMANN TIRE BUILDING MACHINE COMPANY, OF LANCASTER, OHIO, A CORPORATION OF OHIO.

TIRE-BUILDING MACHINE.

Application filed September 22, 1923. Serial No. 664,156.

*To all whom it may concern:*

Be it known that I, WALTER H. HERMANN, a citizen of the United States, residing at Lancaster, in the county of Fairfield and State of Ohio, have invented certain new and useful Improvements in Tire-Building Machines, of which the following is a specification, reference being had therein to the accompanying drawings.

This is a continuation in part of my application for patent on a tire building machine, filed Aug. 9, 1920, Ser. No. 402,471, Patent No. 1,468,809. In this application there is disclosed a tire building machine by which one or more strips of tire fabric may be expeditiously and economically applied to a core or form to build up or form thereon a laminated structure which eventually becomes a homogeneous mass and as such serves as the body or carcass for a tread or outer finishing structure which eventually provides a tire. In this type of machine the fabric passes under a guide roller supported by arms or brackets in proximity to the core and I have found that the juxtaposition of the roller interferes with an attendant guiding fabric under the roller, arranging the fabric on the core preparatory to a building operation, exchanging cores, or passing between the core and the roller to make adjustments in connection with the machine. I have further found that on account of different sizes of cores being used for different sizes of tires that the position of the roller must be changed relative to the core in order that the tire fabric may be conveniently and properly applied.

This invention aims to support a roller so that it may be swung out of the road of an attendant of the machine, and novel means is employed for holding the roller either in an active or inactive position.

My invention further aims to support the roller so that it may be raised or lowered, shifted to and from the core, and thus permit of fabric being built on to a core for tires of various sizes.

My improvements will be hereinafter specifically described and then claimed, and reference will now be had to the drawings, wherein Figure 1 is a side elevation of a tire building machine constructed in accordance with my invention;

Figure 1:
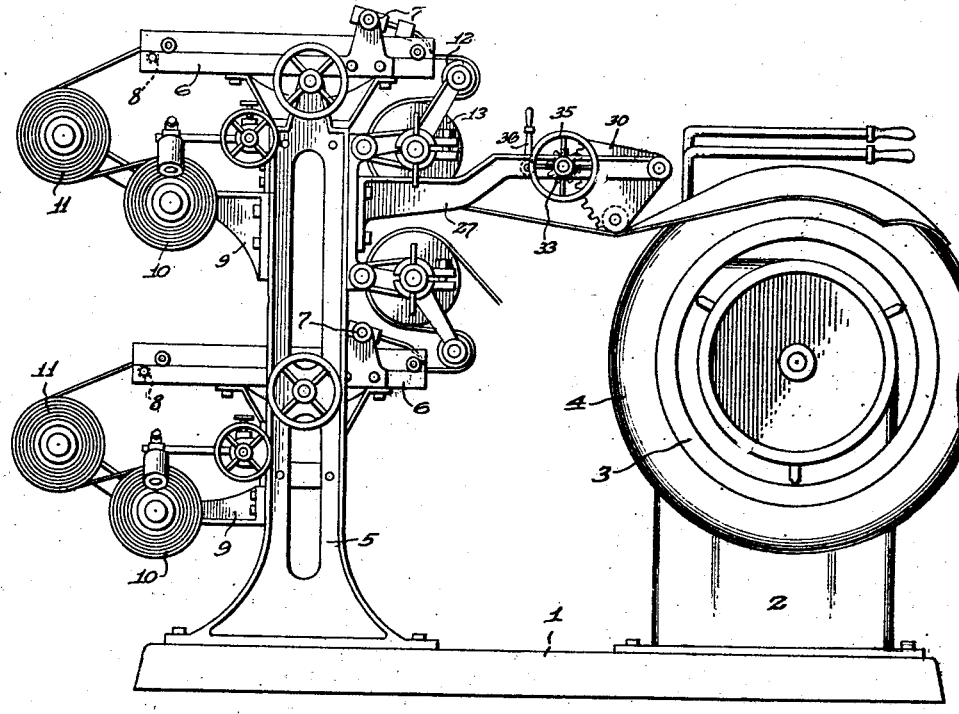

The tire building machine to which my improvements are applicable comprises a base 1 for a support 2 having a rotary collapsible core 3 on which is fabricated a tire body 4. On the base 1 are uprights 5 supporting superposed adjustable platens or guide tables 6 provided with marking devices 7 and suitable guide rollers 8.

At the rear side of the machine there are brackets 9 supporting stock rolls 10 and take-up rolls 11, the latter receiving the usual strips of non-adhesive material which are sandwiched between the convolutions of the adhesive stock; the non-adhesive strips being wound on the take-up rolls as the adhesive material is unwound from the stock rolls.

At the front side of the machine there are guide rollers 12 and tension rollers 13 which cooperate with the guide rollers 12 in guiding fabric from the tables 6 to the core 3. On the front side of the machine is a set of brackets 27 terminating in arms 14 having the outer ends thereof connected by a rod 28. Loose on the rod 28 is a sleeve or hub 29 having its ends provided with sector gears 30, and these sector gears are connected by a rod 31 on which is a rotatable spreader roller 32 which may or may not have threaded portions. In lieu of the rod 31 the roller 32 may have pintles extending into anti-frictional bearings of the sector gears 30 and these sector gears mesh with pinions 33 on a shaft 34 journaled in the arms 14. One end of the shaft 34 has a hand wheel 35 and one of the arms has a gravity pawl or locking device 36 engaging one of the pinions 33, so that after the sector gears 30 are adjusted to correctly position the spreader roller 32, relative to the core, said sector gears may be locked in such position by the gravity pawl 36.

By reference to Fig. 1 it will be observed that the spreader roller 32 is positioned common to the guide or tension rollers 13 and between said rollers and the core 3, so that the fabric from the machine will pass under the spreader roller on to the tire body being fabricated on the core 3. The arc of contact between the fabric and the guide or tension rollers 13 and the tire body may be increased or decreased by raising and lowering the spreader roller and in consequence of such adjustment the fabric is smoothed and conveyed on to various sizes of cores in the same relative position.

Figure 2:
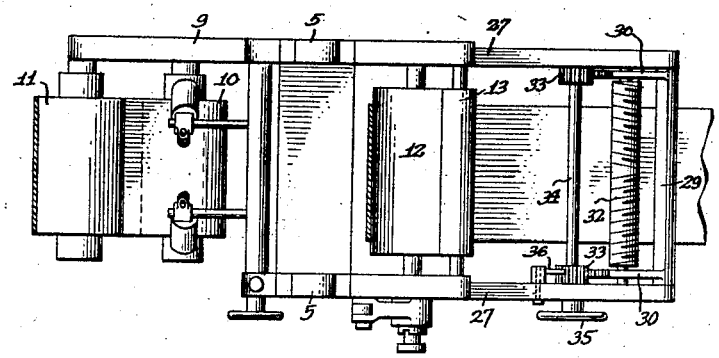
Fig. 2 is a plan of a portion of the same, partly broken away and partly in section.

If the spreader roller 32 is threaded, as shown in Fig. 2, with right and left screw threads extending from the middle of the roller to the ends thereof, such threaded portions cause the fabric to be smoothed out and somewhat stretched, so that it may be evenly applied to the core or body.

Figure 3:
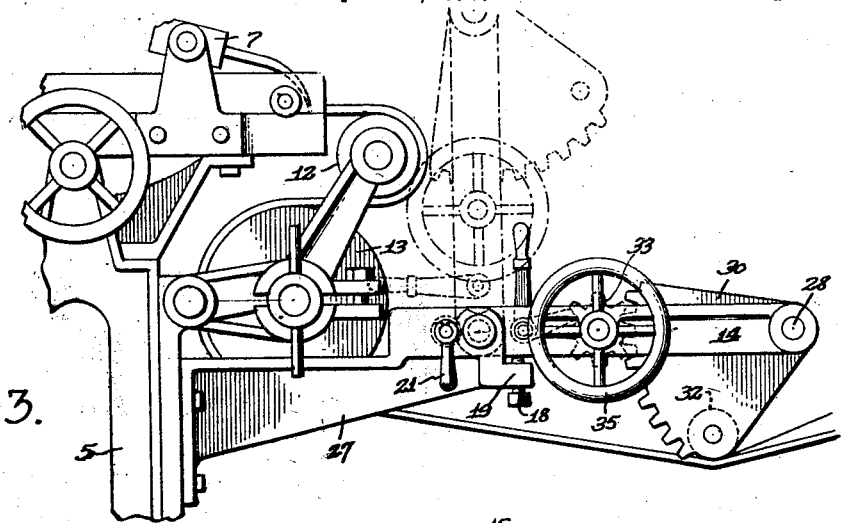
Fig. 3 is an enlarged elevation of a portion of the machine showing an adjustable roller and an adjustable roller support.
Figure 4:
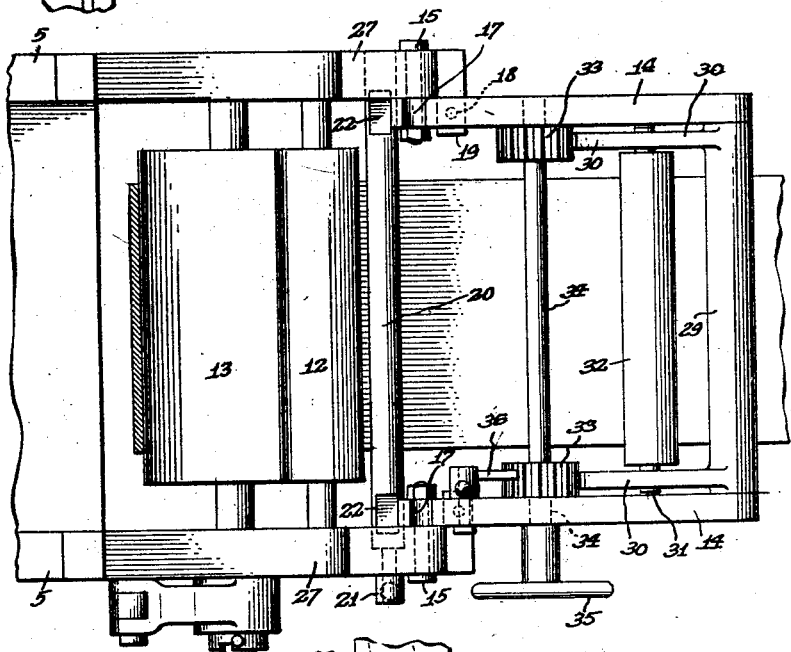
Fig. 4 is a plan of the same.
Figure 5:
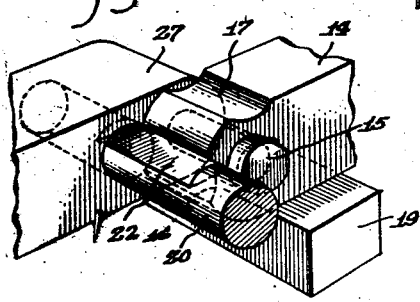
Fig. 5 is an enlarged perspective view of a portion of one of the roller supporting arms showing a locking device therefor.
Figure 6:
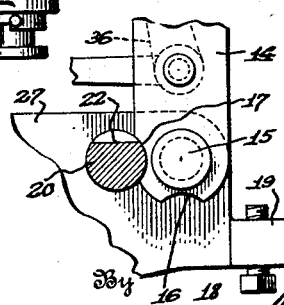
Fig. 6 is a detail sectional view of the same.

The arms 14 may be rigid with the brackets or pivotally mounted at the inner sides of the brackets 27 on pivot bolts or studs 15 and the inner ends of said arms are provided with concave notches 16 and 17. The arms 14 are normally supported in a horizontal position, or approximately so, by set screws or adjustable members 18 carried by extensions 19 of the brackets 27, and journaled in said brackets, adjacent the inner ends of the arms 14, is a transversely disposed locking member, preferably in the form of a rod 20 having a crank or handle 21 at one end thereof, so that said rod may be rocked. The rod is cylindrical throughout and has cut away portions, at the inner sides of the brackets 27, providing flat facets 22 which may confront the inner ends of the arms 14, and provide clearance for said arms, and permit of the arms being swung to a vertical position, as shown by dot and dash lines in Fig. 3. When so positioned the locking device may be actuated to place the cylindrical wall of the rod 21 in the set of notches 17, thus locking the arms 14 in a vertical out of the road position so as not to interfere with the removability of the core 3, the tire body on the core, or any movement of a workman about the core. The arms 14 will be safely supported in a folded position and when released by the locking device may be swung to a lowered active position and locked in such position by the locking device being actuated to place the cylindrical wall thereof in the set of notches 16, as best shown in Figs. 4 and 5.

Since my improvements may be applicable to machines other than the type devised by me, I do not care to confine my invention to the specific construction and arrangement of parts herein shown, other than defined by the appended claims.

What I claim is:—

1. In a tire building machine from which material may travel to a core for the fabrication of a tire on the core, brackets adjacent the core, arms having the inner ends thereof pivotally supported from said brackets and swingable upwardly away from the core to a position at an angle to said brackets, and a roller supported from said arms and adapted for adjustment when said arms are lowered adjacent to said core.

2. An improvement in tire building machines as called for in claim 1, and a locking device operable in said brackets and engageable with the pivoted ends of said arms to hold said arms in an adjusted position.

3. An improvement in tire building machines, as called for in claim 1, wherein said arms are normally horizontal, and means on said brackets under said arms adapted for adjusting the horizontal position of said arms.

4. An improvement in tire building machines, as called for in claim 1, and a rotatable rod in said brackets adapted to engage said arms and hold said arms in an adjusted position, said rod having facets providing clearance for movement of said arms.

5. Roller supporting means for a tire building machine, comprising brackets, notched pivoted arms carried thereby, a roller supported from said arms, and a rotatable rod carried by said brackets adapted to have its wall engage in the notched arms to hold said arms in an adjusted position.

6. In a tire building machine from which material may travel to a core for the fabrication of a tire on the core, pivoted horizontal arms in proximity to the core, racks pivotally supported by the outer ends of said arms, a roller supported by lower portions of said racks below the plane of said arms for producing a tension on the material, and means supported intermediate the ends of said arms for swinging said racks on their pivots to move said roller towards the plane of said arms.

In testimony whereof I affix my signature.

WALTER H. HERMANN.